April 12, 1932.  P. P. PIPES  1,853,222

ELECTRIC CONTROL SYSTEM AND MOTOR STARTER

Filed March 22, 1928

WITNESS:  
H. J. Stromberger

Inventor  
PLINY P. PIPES  
By  
Attorney

Patented Apr. 12, 1932

1,853,222

UNITED STATES PATENT OFFICE

PLINY P. PIPES, OF MANSFIELD, OHIO, ASSIGNOR TO THE OHIO BRASS COMPANY, OF MANSFIELD, OHIO, A CORPORATION OF NEW JERSEY

ELECTRIC CONTROL SYSTEM AND MOTOR STARTER

Application filed March 22, 1928. Serial No. 263,698.

My invention relates to an automatic starting device and system for electric motors.

The object of my invention is to provide a device and a system used in conjunction therewith which is capable of being used in combination with a motor and a source of power and whereby a resistance is first introduced into the system to protect the motor and which is later automatically cut out or short circuited after a predetermined length of time. While my invention is particularly adaptable for use with electric motors, it can, of course, be used with other translating mechanism.

My invention resides in the new and novel construction, combination and relation of the various parts and circuits herein described and shown in the drawings accompanying this specification.

In the drawings:—

In connecting translating devices to an electric power circuit it is very often desirable, as in the case of an electric motor, to protect the same against a sudden rush of abnormal current flow through the motor which may be the cause of damage to the motor, and especially is this true in case the motor is compelled to start from rest with a load.

In my invention I provide a system and mechanism in which resistance may first be interposed between the translating device and the source of power to prevent the rush of current into the motor, and I also employ means for cutting out this resistance or short circuiting the same after a predetermined length of time as gaged by the heat developed in a bimetal thermal element, which heat is produced by current derived from the circuit to the motor, flowing through the bimetal thermal element.

Figure 1:
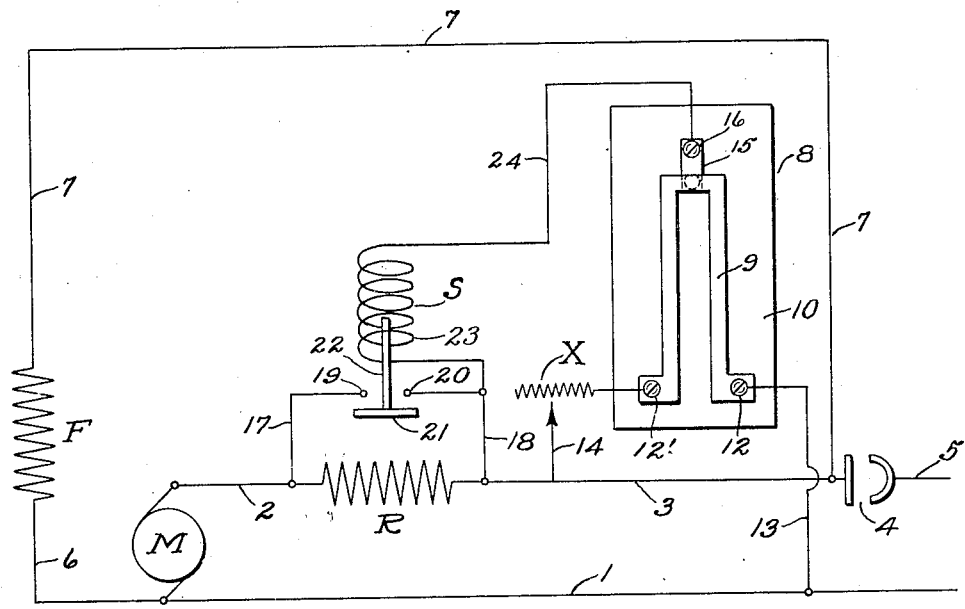
Fig. 1 is a schematic arrangement of the various elements and circuits in combination with an electric motor.
Figure 2:
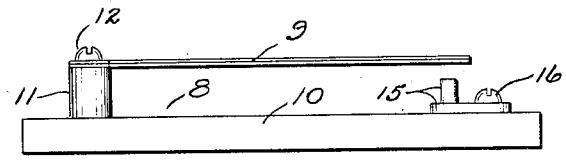
Fig. 2 is a side view of an automatic thermal control mechanism by means of which current flowing to the motor may be automatically controlled and which is one of the elements of my invention.

In Fig. 1, I have indicated a motor M and a field F with one side of the motor connected to a source of power through the conductor 1 and the other side of the motor connected to the source of power through the conductor 2, resistance R, conductor 3, switch or circuit breaker 4 and conductor 5. The field F is connected across the main circuit through the conductors 6 and 7.

At 8 I have shown a U-shaped bimetal thermal element 9 mounted upon an insulated base 10 through the medium of the supports 11, which may be of insulated material or metal, and the fastening screws 12 and 12'. The terminal screw 12 is connected to the supply line 1, through the conductor 13 and the screw 12', connected to the supply line 3 through the variable resistance X and the conductor 14. It will be noted that the thermal element 9 is connected directly across the leads to the motor and with the variable control resistance X in series therewith and therefore the current flowing through the element 9 is independent of the current flowing through the motor M.

The current flowing through the bimetallic thermal element 9 will cause the same to heat, based on Ohms law, and as the temperature of the element 9 increases, the free end thereof will move downwardly until it finally engages with the contact 15 which is held to the base 10 by means of the screw 16. The element 9 is composed of two dissimilar metals such as a ferrous metal and a non-ferrous metal welded together and which when heated will bend more or less depending upon the temperature and the co-efficient affecting the expansion of the two metals.

It will be noted that the element 9 is connected across the mains with the variable resistance X in series therewith and, therefore, the current flowing through the element 9 may be increased or decreased as desired, which will affect the temperature of the element 9 in like manner and cause it to bend downwardly more or less depending upon its temperature, and the time in which the element 9 is brought into contact with the terminal 15 depends upon the rate of heating and temperature of the element 9, which in turn depends upon the current flowing through the element 9 and which again in turn is affected by the adjustment of the resistance X. From this it will be seen that the time in which current of a predetermined value will cause the element 9 to contact with the element 15 may be regulated at will if constant voltage conditions from the source of power are maintained.

Connected to the opposite ends of the resistance R by means of the conductors 17 and 18 are spaced contacts 19 and 20. If these contacts are electrically connected together, then the resistance R is short circuited or cut out and to bring this about I employ a solenoid operated switch S comprising a connecting member or bar 21 to engage with the contacts 19 and 20 and connect the same after current has flowed through the motor for a predetermined time. To move the member 21 into engagement with the contacts 19 and 20, I connect thereto a soft iron plunger 22 which is the core of the coil 23, and when the coil 23 is energized the core is drawn upwardly and with it the connecting bar 21. One end of the coil is connected to the conductor 18 and the other end of the coil is connected to the contact 15 through the medium of the conductor 24 and screw 16.

It will be seen that when the thermal element 9 engages the contact 15 that current will then flow through the coil 23 as it will then be connected across the mains 1 and 3 through one leg of the thermal element, providing the switch 4 is closed. The current permitted to flow through the element 9 may be comparatively small and also through the coil 23 as such flow will depend upon the resistance of the coil 23 and the value of the resistance X and the member 9 will necessarily be so dimensioned as to operate with respect to the desired current limits therethrough.

If now my described invention is connected to the motor M and field F, as shown, then when the switch 4 is closed current will immediately flow to the motor through the mains 1, 2 and 3 with the resistance R in series and to the motor field through the conductor 7. The resistance R will choke back or resist the flow of an excessive amount of current on the closing of the switch 4 and therefore permit the motor to start more gradually and constantly gain in speed up to an amount which the resistance R and the back E. M. F. of the motor will permit. When this point is reached it is then desirable to have the resistance R cut out and the motor thrown directly on to the line, which can be done without an excessive flow of current through the motor, and this is brought about by the fact that from the moment the switch 4 is closed current will flow through the bimetallic thermal element 9 and gradually cause the same to heat and as its temperature increases it will bend downwardly until finally it will contact with the element 15 and when this occurs, then the current will flow through the coil 23 and the connecting bar 21 will be moved into engagement with the elements 19 and 20, which will instantly short circuit the resistance R thereby throwing the motor directly across the source of power. As long as the switch 4 is closed the current will flow through the elements 9 and the coil 23, thereby maintaining the resistance R short circuited until the switch 4 is opened either automatically or manually, thereby permitting the element 9 to cool off which takes place quite rapidly and the circuit to the coil 23 will be opened and the resistance reset for normal starting conditions when the switch 4 is again closed.

There will, of course, be modifications from my invention herein disclosed and shown in the drawings which will be evident to those skilled in the art. Therefore, I do not wish to be limited other than by my claim.

I claim:—

The combination with a motor, of a starting resistor, a source of power, means for establishing starting and running connections for said motor including and excluding said resistor respectively, comprising an electro-magnetic switch to shunt out the resistor after a predetermined time after the starting connections are established and having an energizing coil to be connected across the source of power and energized by current therefrom independent of the current to the motor, a thermal device responsive to non-inductive current to complete the continuity of the coil connections to the source of power and subject to heating by the current through the coil, the thermal device operable after current has flowed to the motor for said predetermined time and maintaining said continuity permanently connected to the source of power and, the thermal device being heated primarily by current direct from the source of power and finally by the addition of the said current energizing the coil, the current through the thermal device being dependent upon the voltage of the source of supply and independent of the current to the motor.

In testimony whereof I affix my signature.

PLINY P. PIPES.